(12) United States Patent
MacMahon et al.

(10) Patent No.: US 7,836,055 B2
(45) Date of Patent: Nov. 16, 2010

(54) XNA RELATIONSHIP MANAGEMENT

(75) Inventors: Mel MacMahon, Kirkland, WA (US);
Boyd C. Multerer, Seattle, WA (US);
Frank F. Savage, Redmond, WA (US);
Josefa M. Nalewabau, Sammamish, WA (US); Nicolas Gauvin, Redmond, WA (US); Shawn Hargreaves, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1326 days.

(21) Appl. No.: 11/343,455

(22) Filed: Jan. 31, 2006

(65) Prior Publication Data
US 2007/0220031 A1 Sep. 20, 2007

(51) Int. Cl.
*G06F 17/28* (2006.01)
*G06F 9/54* (2006.01)
(52) U.S. Cl. .................. 707/740; 707/798; 707/899; 717/107; 717/121; 717/122; 717/168
(58) Field of Classification Search ............. 707/104.1, 707/999.104, 740, 798, 899, 104; 717/120, 717/122, 121, 168, 107
See application file for complete search history.

(56) References Cited

U.S. PATENT DOCUMENTS

| | | | |
|---|---|---|---|
| 6,181,336 B1 | 1/2001 | Chiu et al. | |
| 6,681,265 B1 | 1/2004 | Hlava | |
| 2002/0124082 A1 | 9/2002 | San Andres et al. | |
| 2002/0133516 A1 | 9/2002 | Davis et al. | |
| 2004/0046800 A1 | 3/2004 | Emerson ............... | 345/810 |
| 2004/0177093 A1* | 9/2004 | Mullins .................. | 707/104.1 |
| 2005/0228829 A1* | 10/2005 | Richards et al. ......... | 707/104.1 |

FOREIGN PATENT DOCUMENTS

| | | |
|---|---|---|
| EP | 1426877 | 6/2004 |
| JP | 2005107590 | 4/2005 |
| WO | WO97/25679 | 7/1997 |
| WO | 2005119496 | 12/2005 |

OTHER PUBLICATIONS

Loto-Quebec Selects Percussion Software's Rhythmyx 5 Enterprise content Management Solution to Support Multiple Gaming and corporate Web Sites. http://www.percussion.com/news/press-releases/2004/601.html Printed Nov. 9, 2005. 1 pg.

(Continued)

*Primary Examiner*—James Trujillo
*Assistant Examiner*—Bruce M Moser
(74) *Attorney, Agent, or Firm*—Workman Nydegger

(57) ABSTRACT

A data provider application programming interface (API) is configured for use with a game content editing application. An asset relationship management file, which is generated with the data provider API, includes information such as relationship references and annotations and is updated by the data provider API when a digital asset is edited. The asset relationship management file is then stored in a data store. An asset relationship graph is generated, based on the asset relationship management file in the data store. The asset relationship graph includes asset graph nodes that map dependency relationships between asset files. A graph API is also described. The graph API is configured for accessing the relationship graph through a server process to expose dependency relationships and annotations to a client process, such as an application. Thus, the effect of changes to one asset on other assets can readily be evaluated.

14 Claims, 6 Drawing Sheets

OTHER PUBLICATIONS

XML Content Management: Challenges and Solutions http://www.gca.org/papers/xmleurope2001/papers/html/sid-02-5.html Printed Nov. 9, 2005. 15pp.

Omoruyi, Otamere; "Managing Digital Assets in Game Development"; http://www.gamedev.net/reference/articles/article1371.asp; Accessed May 8, 2009; 5 pages.

* cited by examiner

XNA RELATIONSHIP MANAGEMENT

BACKGROUND

Media consoles such as those used for playing video games have achieved significant market penetration over the last few years. Consequently, game developers are particularly concerned with producing games to bring to market in an expedient manner. However, developing games and other media console software requires considerable effort by large teams of artists and programmers. Game development teams composed of artist and programmers often work on discrete portions of a new game without explicit knowledge of concurrent efforts of other artists and programmers within their own development groups. In such a development environment, a game component developed by an artist may include several component elements that are also included in other components.

A number of components of a game or other software application may share software elements, with different components having a dependency relationship with the same element file or data. For example, the shape of a car in a game might be defined by an original "car" mesh, to which several colors, materials and textures are applied. For example, a specific red may be employed for the car body color, and "chrome," which may comprise both a texture and a color, might be used for highlights on the car. In this example, the color/texture "chrome" will also likely be used for other cars and components of the game. Unfortunately, during game development when an artist changes a color or texture element that is shared by other components, it may not be possible to easily determine which other components are affected by the artist's changes. Furthermore, multiple dependencies may not become apparent until an application has been compiled and executed, rendering an unintended change apparent only during a quality review cycle. Moreover, it may be difficult to determine the artist that actually caused an undesirable change when modifying a mutually shared component texture or color without reviewing each component of a game that would be affected, prior to the step of compiling.

Changes are often made that result in texture files that were once used being no longer used in a game, but still included in the file set for the game. As a result, many games include surplus content and/or orphaned files, which are no longer used or needed by the game. Because it may not be clear what components would be adversely affected by deleting texture files, game developers are hesitant to delete content during development. Accordingly, there is a need within the game development industry for new approaches to be developed that facilitate managing game content and the relationships between components and files used in rendering those components. An approach is needed that is universally applicable at minimal cost, and which address these and other related problems that arise during the development of games.

SUMMARY

Several examples are provided below that describe implementations for managing digital game content relationship information. The game content relationship information is generally associated with a set of digital game content files that exist within a distributed processing system, such as a client-server game development environment, for example.

One implementation described in more detail below includes steps such as providing a data provider API for communicating between a client process and a server process. The data provider API is described as being configured for use with a game content editing application or tool. Another step is directed to generating an asset relationship management file using the data provider API. In this exemplary implementation, the asset relationship management file includes information, such as a relationship reference and an annotation. The asset relationship management file is produced by the data provider API for a digital asset being edited by the client content editing process. This content and editing process can be, for example, part of an art editing, or sound editing application. Yet another step is directed to storing the asset relationship management file to a data store. Finally, the exemplary implementation includes the step of generating an asset relationship graph that is based on a set of asset relationship management files. The asset relationship graph generally includes asset graph nodes that map dependency relationships between digital game content files. Another exemplary implementation described below includes the step of providing a graph API for communicating between a client process and a server process in the distributed processing system. In this exemplary implementation, the graph API is configured for accessing the relationship graph through a server process to expose asset relationship data and annotation data to the client process.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Furthermore, in the claims that follow, when a list of alternatives uses the conjunctive "and" following the phrase "at least one of" or following the phrase "one of," the intended meaning of "and" corresponds to the conjunctive "or."

Exemplary Computing System

Figure 1:
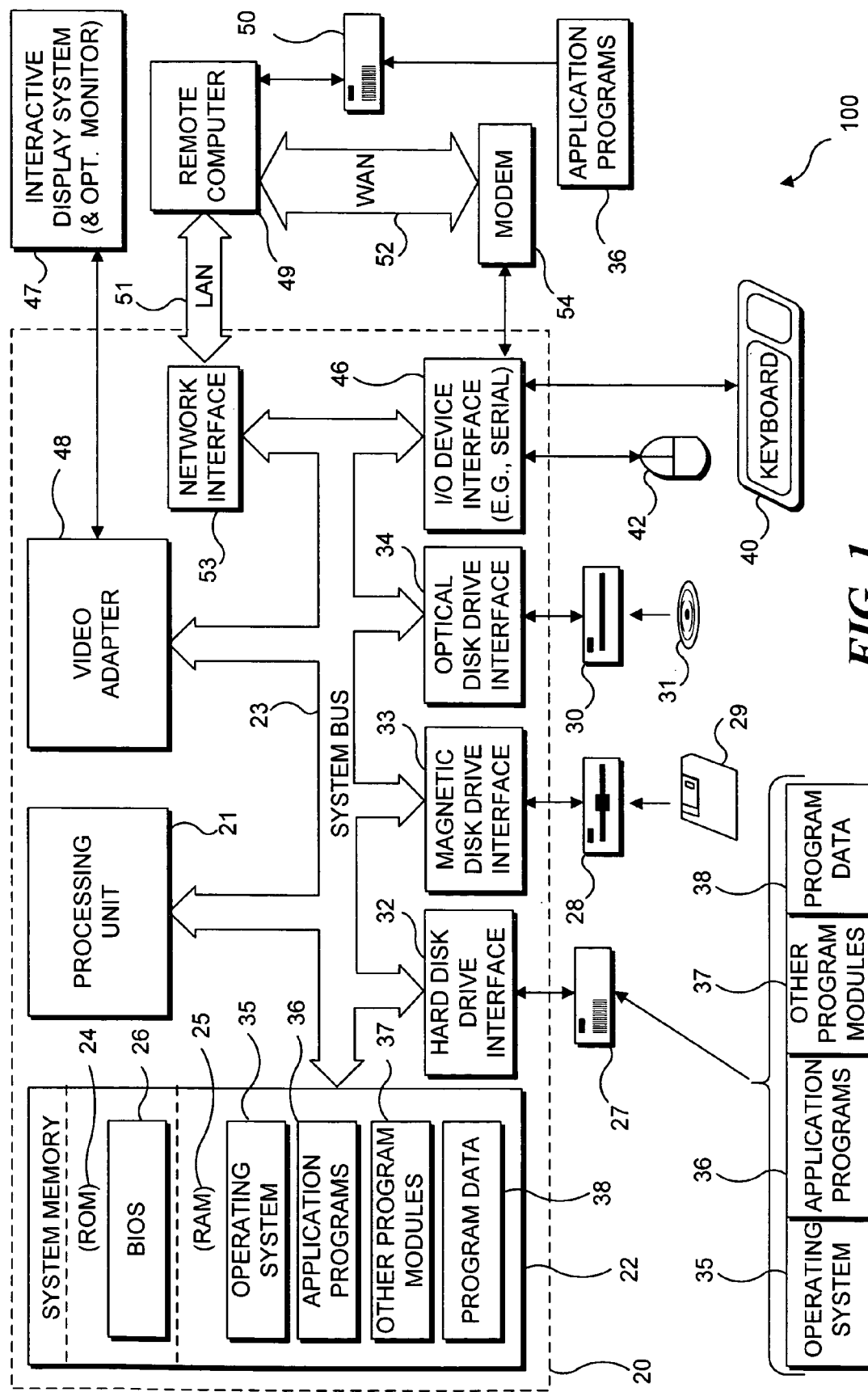
FIG. 1 is a functional block diagram of a generally conventional computing device that is suitable of implementing one or more grade level tagging and/or searching functions.

FIG. 1 is a functional block diagram of an exemplary computing device and/or computer server for enabling various aspects of digital content relationship management functions initiated on computing devices, such as over a network, the Internet, or even on a single computing device.

The following discussion is intended to provide a brief, general description of a suitable computing environment in which certain methods discussed below may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when a server functionality is required), and the like. One implementation includes distributed computing environments where tasks are performed by remote processing devices that are linked through a communications network. In a distributed computing environment, program modules may be located in both local and remote memory storage devices.

With reference to FIG. 1, an exemplary system suitable for implementing various methods is depicted. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the described exemplary environment employs a hard disk 27, removable magnetic disk 29, and removable optical disk 31, those skilled in the art will recognize that other types of computer readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules and/or data may be stored on hard disk 27, magnetic disk 29, optical disk 31, ROM 24, or RAM 25, including an operating system 35, one or more application programs 36, other program modules 37, and program or other data 38. A user may enter commands and information in PC 20 and provide control input through input devices, such as a keyboard 40 and a pointing device 42. Pointing device 42 may include a mouse, stylus, wireless remote control, or other user interactive pointer. As used in the following description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers, or a network. These and other input/output (I/O) devices can be connected to processing unit 21 through an I/O interface 46 that is coupled to system bus 23. The phrase "I/O interface" is intended to encompass each interface specifically used for a serial port, a parallel port, a game port, a keyboard port, and/or a universal serial bus (USB). Optionally, a monitor 47 can be connected to system bus 23 via an appropriate interface, such as a video adapter 48. In general, PCs can also be coupled to other peripheral output devices (not shown), such as speakers (through a sound card or other audio interface—not shown) and printers.

Certain processes described in detail below, can be practiced on a single machine, although PC 20 can also operate in a networked environment using logical connections to one or more remote computers, such as a remote computer 49. Remote computer 49 can be another PC, a server (which can be configured much like PC 20), a router, a network PC, a peer device, or a satellite or other common network node, (none of which are shown), and a remote computer will typically include many or all of the elements described above in connection with PC 20, although only an external memory storage device 50 for the remote computer has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet. In one particular implementation, PC 20 is a component of a game development environment that includes other computing devices, such as server computers, other PCs, databases and the like.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Operating Environment

Figure 2:
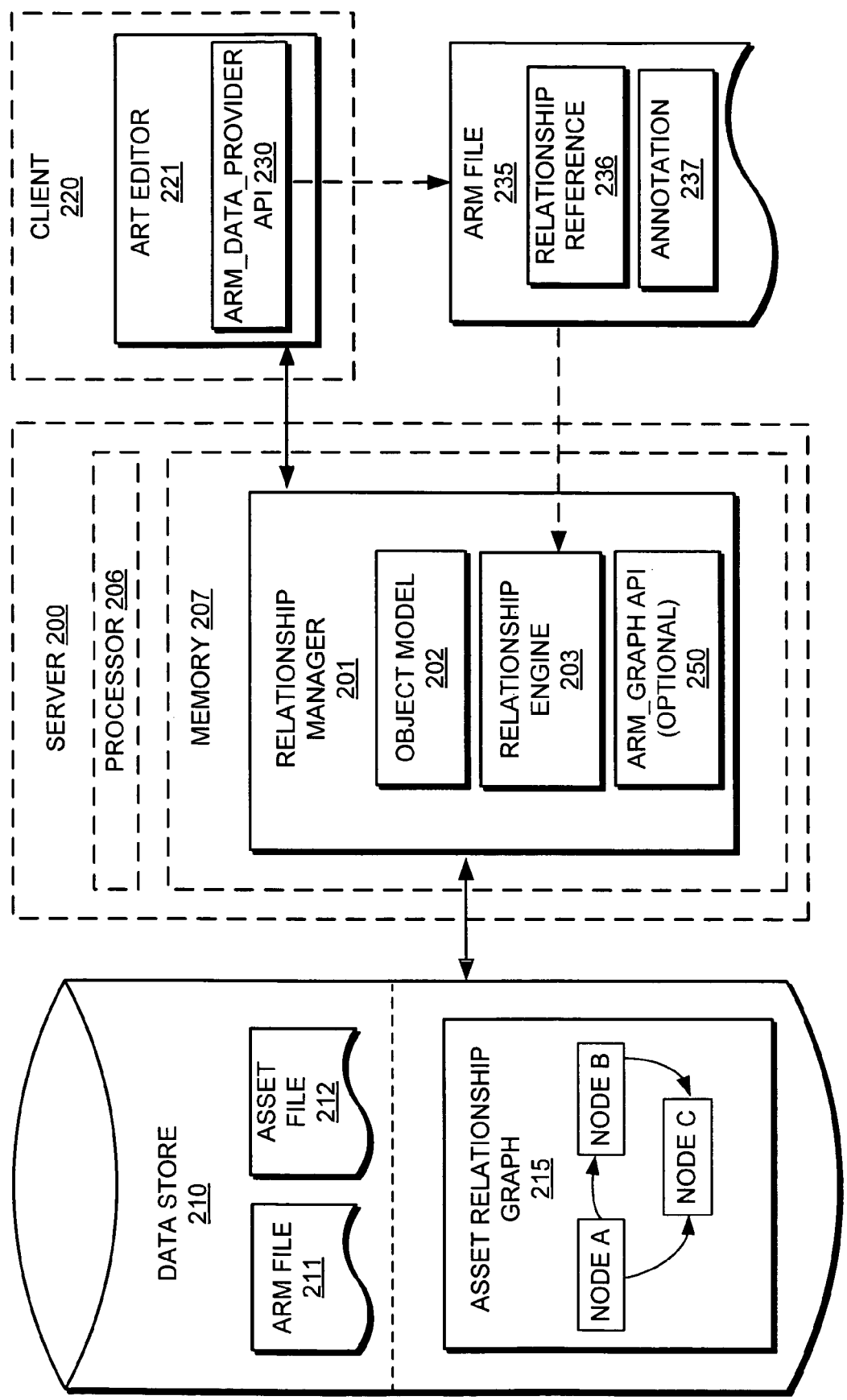
FIG. 2 is a functional block diagram of a system for enabling digital content relationship management.

FIG. 2 is a block diagram of an exemplary operating environment 200 for implementing various methods for managing relationships between digital content. As shown in FIG. 2, a server 200 is in communication with a data store 210 and a client 220. An asset relationship management (ARM) file 235 being generated by client 220 is illustrated in FIG. 2.

Server 200 can be any computing device, such as the exemplary computing device and/or computer server discussed with reference to FIG. 1. Although it will be apparent to the skilled practitioner that server 200 includes such components, for clarity and to simplify the disclosure, server 200 is only illustrated as including a processor 206 and a memory 207. Memory 207 is shown including a relationship manager application 201 that includes an object model module 202, a relationship engine module 203, and can also include an ARM_graph API 250, each of which will be discussed in detail below.

Client 220 can be any computing device or system such as the exemplary computing device and/or computer server discussed with reference to FIG. 1. In some implementations, client 220 is a PC coupled to a network such as a LAN or WAN, or one or more other computing devices through a secure connection over the Internet (not shown). In other implementations, client 220 can be any computing device configured to run applications such as art editors, sound editors, asset report generators and other productivity applications. As depicted in FIG. 2, client 220 includes an art editor application 221, which may be used to access, create, modify and/or manage digital content, such as digital game components. A digital game component is one element of an executable game application, including for example, a mesh file, a texture and/or material file, a sound file, an artificial intelligence (AI) file, or other logic file, or any other digital asset file that can share dependencies with other game components. Art editor 221 is shown as including an ARM_data_provider API 230. However, ARM_data_provider API 230 can be an add-on component or module that is appended to art editor 221, or merely accessed by art editor 221 through an API call. It is intended that ARM_data_provider API 230 will be readily configured to retrofit a broad range of existing applications in order to enable the provision of valuable asset relationship data in a development platform independent format.

ARM file 235 can include any exportable information about a specific digital asset, including a relationship reference 236, and an annotation 237. Relationship reference 236 is a logical statement and/or an indicator that defines a dependency or referential relationship that the specific digital asset has with any other digital asset. For example, if the specific digital asset is a mesh file, relationship reference 236 can be a logical statement that the mesh references a specific material file. However, if the specific digital asset is instead the specific material file (such as a file that defines a color), the relationship reference 236 can be a logical statement that the mesh depends on the specific material file. Annotation 237 can include other information that may be useful to export. For example, the annotation can include an asset version indicator, an asset approval indicator (e.g., indicating sign off by an artist), an asset description, an asset type indicator, a rule associated with an asset, and an attribute associated with the asset. The annotation can also provide specific information, such as a color depth indicator, compression algorithm information associated with the asset, or a specific date such as for indicating the last edit of the asset or a final sign off date for example. In one implementation, ARM file 235 is a data structure embodied in an XML document according to an asset relationship management schema. In this implementation, the schema defines a format for objects representing data written out from an asset file by the ARM_data_provider API, such as asset identification, relationship references associated with the asset and various annotations. Although XML is a widely accepted and application neutral document format, it should be noted that the ARM file can be embodied in any appropriate document format and is not limited to an XML format.

Data store 210 provides storage for and includes a plurality of data structures such as ARM file 211 and asset file 212, and asset relationship graph 215. ARM file 211 can be any asset relationship management file as described in relation to ARM file 235. Asset file 212 is generally a digital content file, such as a mesh file, a material file, a sound file, or another digital game component file. Asset relationship graph 215 can include a plurality of nodes as illustrated in FIG. 2 by nodes A, B, and C. By way of illustration, FIG. 2 shows that node A refers to node B and node C, while node B refers to node C, yet node C refers to neither node A nor node B. Furthermore, nodes A, B, and C can include a tree structure that further defines a mapping of nodal dependencies and additional information, such as annotations (not shown).

By way of illustration and clarity, server 200 is shown as including a relationship manager 201, which is depicted in FIG. 2 as including an object model module 202, and a relationship engine module 203. However, in some implementations, relationship manager 201 is actually one executable module, which provides the functionality of both object model 202 and relationship engine 203. In other implementations, object model 202 and relationship engine 203 are implemented as separate, but operationally integrated modules. ARM_graph API 250 can optionally be located with object model 202 and relationship engine 203 on server 200, or can be integrated into an operating system (not shown) of server 200, or as part of an application, or can be configured as a freestanding module. It is intended that ARM_graph API 250 be configured to retrofit a broad range of existing applications in order to enable access to asset relationship data in asset relationship graph 215, thereby providing the beneficial functionality of this approach to these existing applications.

Object model 202 is configured to provide an interface to asset relationship graph 215. In one implementation, object model 202 is configured to respond to a call from an ARM_graph API requesting asset information by navigating the nodes of the asset relationship graph and returning dependency information to a calling application. In this instance, the calling application can be any application enabled for communication with object model 202 (e.g., through the ARM_graph API), such as a third-party tool, various custom tools, a game build system, or even a game itself. Relationship engine 203 is generally configured to aggregate the ARM files (e.g., ARM file 211) contained in data store 210 and to generate a multi-graph representation of all of the different relationships, dependencies, and content annotations described by the ARM files.

In one exemplary implementation, relationship engine 203 is configured to monitor data store 210 in real-time to identify new or modified ARM files as they are created. In this implementation, the relationship engine can be configured to parse the ARM file and generate a node in the asset relationship graph that contains relationship information and annotations for an asset identified by the ARM file. In another implementation, which is not shown in FIG. 2, relationship engine 203 is configured to instantiate a relationship graph in memory under its control on-the-fly, in response to an ARM_graph API call. In this implementation, the asset relationship graph would reside in memory 207 rather than within data store 210. This implementation may be preferable in terms of run time efficiency, where a number of clients seek simultaneous access to asset relationship information that is rapidly changing, and where the total number of nodes is not exceptionally large.

Figure 3:
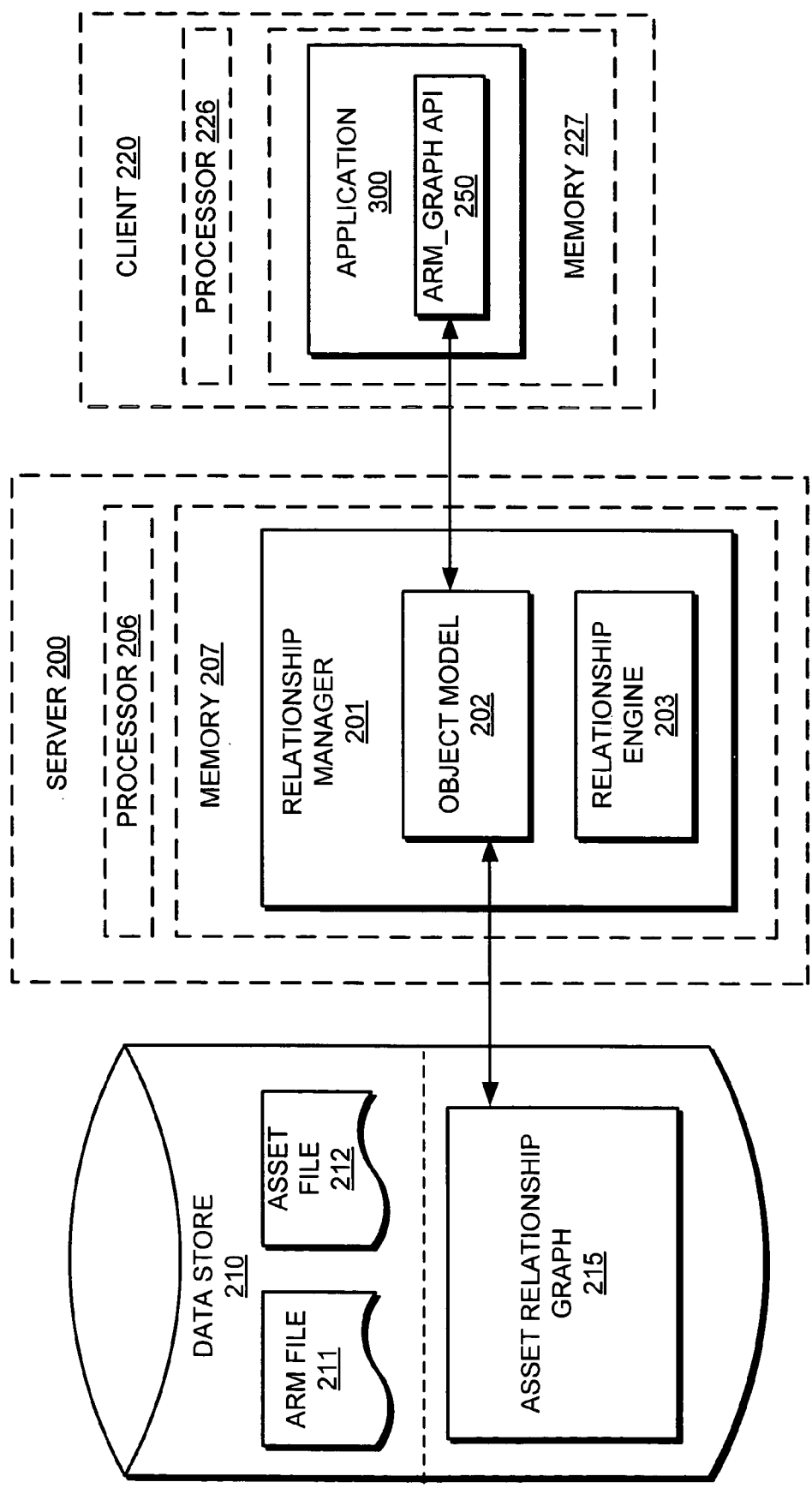
FIG. 3 is another functional block diagram of a system for enabling digital content relationship management.

By way of further illustration, FIG. 3 is another functional block diagram of a suitable operating environment for enabling digital content relationship management. As depicted in FIG. 3, server 200 is again shown in communication with a data store 210 and a client 220. The embodiment illustrated in FIG. 2 depicts data store 210 as again including ARM file 211, asset file 212, and asset relationship graph 215. Server 200 is again depicted as including processor 206 and memory 207, with memory 207 having relationship manager 201 stored within it. As discussed above, relationship manager 201 includes object model 202 and relationship engine 203. For a discussion of the functionality and capabilities of each of these elements, reference can be made to the discussion above regarding FIG. 2. Client 220 of FIG. 3 represents a computing device, such as discussed above with reference to FIGS. 1 and 2. Although it will be apparent to the skilled practitioner that client device 220 will incorporate many of the other components of FIG. 1, for clarity, FIG. 3 only illustrates a processor 226 and a memory 227 used for storing an application 300. An ARM_graph API 250 is depicted within application 300. However, ARM_graph API 250 need not be integrated into application 300, and in some implementations, is a plug-in or a freestanding module for use with an application or an operating system (not shown) of client 220.

As was discussed above, it is intended that ARM_graph API 250 can be configured to retrofit a broad range of existing applications and/or operating systems, to enable access to asset relationship data in the asset relationship graph 215 from a process executing on the client device. In one example, application 300 is a reporting tool that can be used to generate asset dependency reports, which can be utilized during game development to identify orphaned assets or to trace unwanted changes to asset files. In another implementation, application 300 may be a component application of a game build pipeline, which can call the asset relationship graph 215 through the ARM_graph API in order to, for example, optimize the building or rebuilding of a game executable, test functionality, implement quality assurance tasks, and implement a certification approval process.

Figure 4:
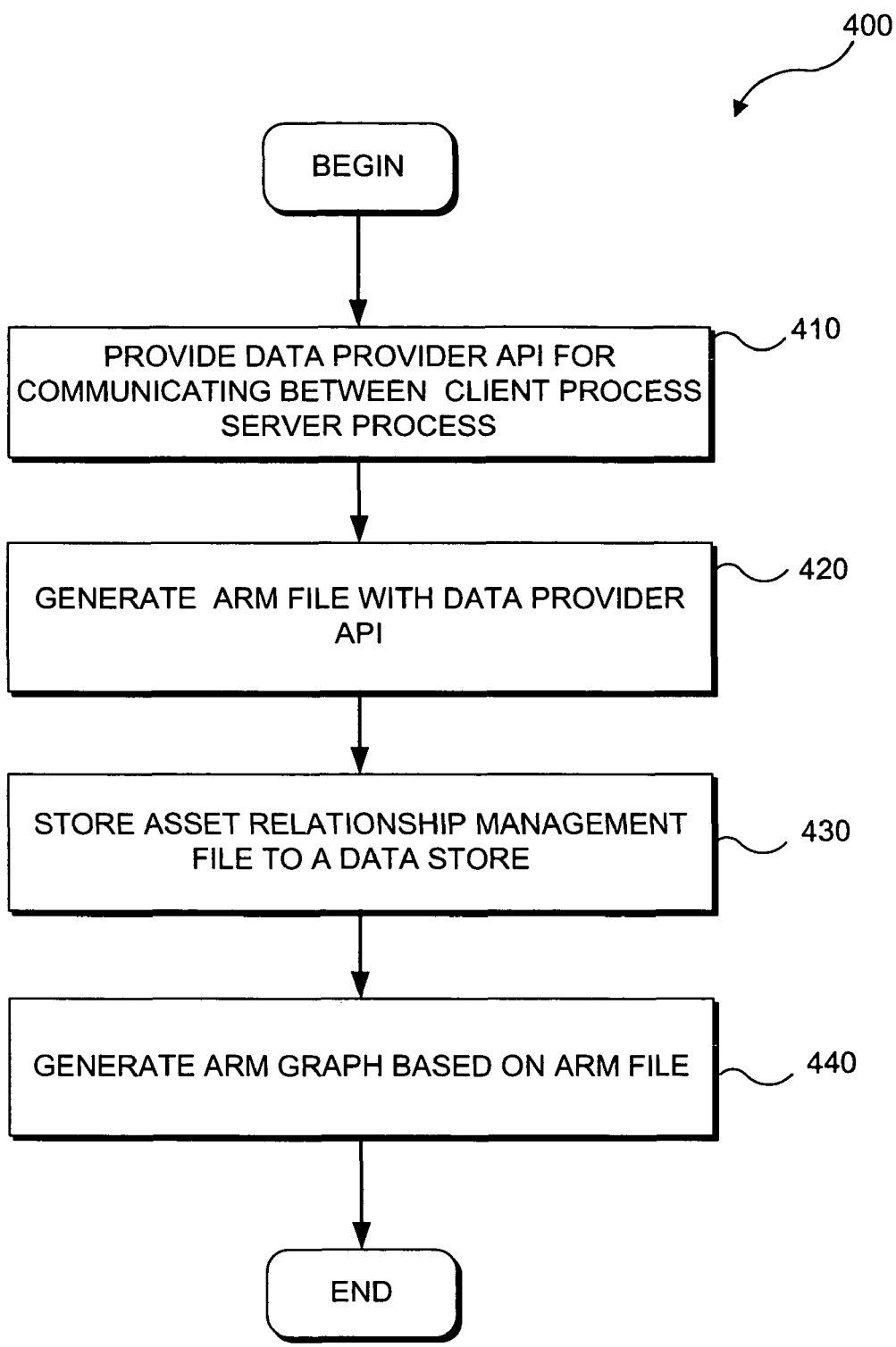
FIG. 4 is a flow diagram illustrating the steps of an exemplary method for managing digital game content relationship information associated with digital game content files within a distributed processing system.

FIG. 4 is a flow diagram illustrating the steps of an exemplary method for managing digital game content relationship information associated with digital game content files within a distributed processing system. Method 400 can be implemented in some embodiments with components, devices, and techniques as discussed with reference to FIGS. 1-3. In some implementations, one or more steps of method 400 are embodied on a computer readable medium that stores computer readable code so that a series of steps are implemented when the computer readable code is executed on a computing device, such as a microprocessor. In the following description, various steps of method 400 are described with respect to a processor of a client device that can perform certain method steps, in communication (as appropriate) with a server that can also perform certain method steps. In some implementations, certain steps of method 400 can be combined, and performed simultaneously or in a different order, without deviating from the objective of method 400 or without producing different results.

Method 400 begins at a step 410, where a data provider API is provided for communicating between a client process and a server process in the distributed processing system. In one implementation, the data provider API can be configured for use with a game content editing application or tool. Generally, the data provider API can be provided as a plug-in, or add-on component for use with an existing application or software module. The data provider API is enabled when it is installed and configured for operation with an application, such as an art editor for mesh or sound editing.

In a step 420, an asset relationship management file is generated with the data provider API. In some implementations, an asset relationship management file can include a digital asset identification that uniquely identifies a specific digital asset file, a relationship reference that describes linking and/or dependency relationships with other digital asset files and an annotation which can include information related to or about the asset file. Generally, the asset relationship management file is written out by the data provider API from a digital asset that is being edited by a client content editing process, such as editing a mesh file or a sound file.

In a step 430, the asset relationship management file is stored in a data store, e.g., on a hard drive. The asset relationship management file can be stored at any time after it is generated. In some implementations, the ARM file is first cached and then stored. In another implementation, the ARM file is queued by a relationship engine prior to being stored, in order to allow immediate processing of the file. Some implementations of the ARM file can include an asset relationship management schema that defines an annotation object and a relationship reference object. In one example, the asset relationship management file is embodied in an XML document according to the asset relationship management schema. In another example, an annotation can include one or more of an asset version indicator, an asset approval indicator, an asset description, or a color depth indicator. In other examples, an annotation can include one or more of: compression algorithm data associated with an asset, a date indicator, an asset type indicator, a rule associated with the asset, or an attribute associated with the asset. Annotations can be any information that could be useful to write out from an asset and make available as a resource for other users in the processes.

In a step 440, an asset relationship graph is generated, based on the asset relationship management file. In some implementations, the asset relationship graph is composed of a series of asset graph nodes that map dependency and referential relationships between a set of digital game content files. In one exemplary implementation, the step of generating includes the step of first providing the asset relationship management file to a relationship management engine. In this implementation, the relationship management engine can be configured for communication with the data store. This implementation also includes the step of parsing the asset relationship management file to identify each relationship reference and annotation. A final step of the implementation includes generating a node tree in the asset relationship graph. In this step, the node tree is first associated with the asset relationship management file and then mapped to each asset node of the asset relationship graph that is associated with any relationship references and annotations that were identified in the step of parsing. Therefore, each node of the asset relationship graph will correspond to a digital content file such as a game component, and will map the relationship between itself and any other digital content file described by an ARM file accessible to the relationship management engine. Another exemplary implementation further includes the step of configuring the relationship engine to monitor the data store and identify each new asset management file and then invoke the relationship engine to map each identified new asset management file into an instantiation of the asset relationship graph as a unique node. It should be noted that the asset relationship graph can be instantiated within a data store or any other suitable memory location, such as for example within server memory.

Another exemplary implementation further includes the step of providing a graph API for communicating between a client process and a server process in the distributed processing system. In some implementations, the graph API can be configured for accessing the relationship graph through a server process in order to expose asset relationship data and annotation data to the client process. One implementation of the graph API includes a series of steps, such as receiving a call to the graph API from a client process requesting information associated with a specific asset, and issuing an asset information request from the graph API in response to the call. Further steps include interrogating the relationship graph for the information associated with the specific asset, and then returning a response to the request to the client process from the graph API. In this implementation, the response is associated with the specific asset and is based on the interrogation.

Another exemplary implementation includes a series of steps, such as accessing an asset relationship object model through the graph API. In this implementation, the asset relationship object model is configured to navigate the plurality of asset nodes of the asset relationship graph and then expose relationship references and annotations. The next step in this implementation includes identifying each relationship reference in the asset relationship graph that is associated with the specific asset.

Figure 5:
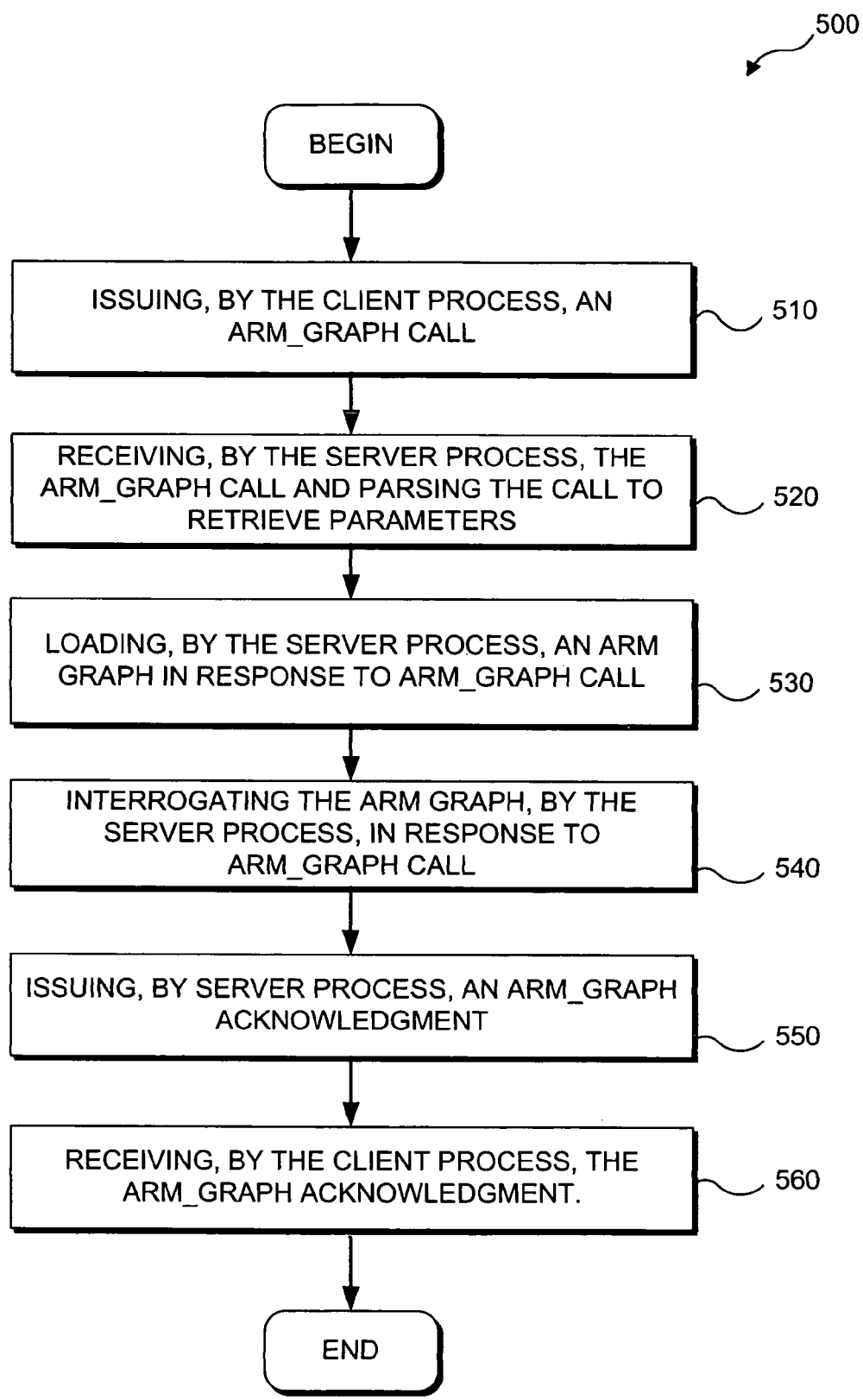
FIG. 5 is a flow diagram illustrating an exemplary method for accessing an asset relationship through an ARM_graph application programming interface (API)

FIG. 5 is a flow diagram illustrating an exemplary method 500 for accessing an asset relationship through an ARM_graph application programming interface (API). Method 500 can be implemented in some embodiments with components, and techniques discussed with reference to FIGS. 1-3. In some implementations, one or more steps of method 500 are embodied in a computer readable medium containing computer readable code so that a series of steps are implemented when the computer readable code is executed on a computing device, such as a microprocessor. In the following description, parts of method 500 are described with respect to a processor of a client device that can perform certain method steps, in communication (as appropriate) with a server that can also perform other parts of the method. In some implementations, certain steps of method 500 can be combined, and performed simultaneously or in a different order, without deviating from the objective of method 500 or without producing different results. Method 500 generally describes an API process and begins at a step 510.

In step 510, an ARM_graph call is issued by the client process. The ARM_graph call can include one or more call parameters, such as, an asset identifier, a data store identifier, and a client requested function. The ARM_graph call can occur at any time that a graph API is enabled. In some implementations, the graph API can be located at either the client side or server side, but can be invoked by a client process in both instances.

In a step 520, a server process receives the ARM_graph call and then parses the call to retrieve the parameters. In some implementations, the ARM_graph call immediately invokes a server process to parse the call and retrieve the parameters. In other implementations, where multiple calls may arrive from different clients within a small window, a call can be cached in a FIFO buffer or a queue and then served in the order of receipt.

In a step 530, the server process loads an ARM graph in response to the ARM_graph call. The ARM graph can be loaded from an existing ARM graph located in a data store or alternatively can be loaded as an instance generated on-the-fly based on the call. The ARM graph can be loaded immediately or queued based on whether another load process is executing. In one implementation, the ARM graph is loaded by first accessing each ARM file in a data store that corresponds to a digital asset file and then extracting each reference to an asset file from each ARM file, generating a node for each asset file and than mapping each relationship between asset files via the nodes.

In a step 540, the server process interrogates the ARM graph in response to the ARM_graph call. Generally, the interrogation is based on parameters parsed from the ARM_graph call. In one exemplary implementation, the interrogation includes navigating one or more nodes of the ARM graph to identify one or more asset identifiers corresponding to specific asset files, based on the parameters parsed from the ARM_graph call, and surface relationships and annotations related to the specific asset files. The interrogation can occur at any time after the call is received, and an ARM graph is available for interrogation.

In a step 550, the server process issues an ARM_graph acknowledgment having a plurality of acknowledgment parameters including the asset identifier, and at least one of an asset relationship reference and an annotation. In some implementations, the acknowledgment parameters can include relationships and annotations determined by the ARM_graph interrogation. In some implementations, the server process can issue the ARM_graph acknowledgment immediately upon completion of an interrogation. In other implementations, the ARM_graph acknowledgment can be queued and issued at a later time, depending on external parameters.

In a step 560, the client process receives the ARM_graph acknowledgment. In some implementations the client process can receive the ARM_graph acknowledgment at any time after the acknowledgment has issued and a client process is active for receiving communications. A further implementation includes the steps of parsing the ARM_graph acknowledgment to retrieve the acknowledgment parameters and then providing the retrieved parameter to a client application process. In an example, an ARM_graph API can be configured to receive the ARM_graph acknowledgment, parse the acknowledgment parameters and then provide the retrieved parameters to a reporting application or art editor for example.

In one exemplary implementation, a data structure stored on a tangible computer readable medium includes a first ARM graph node representing a first asset. In this implementation, the first node can include a first asset identifier for uniquely identifying a first digital asset, such as a game component, a relationship reference defining a relationship to another asset, and an annotation that can include information about the asset, such as a binary name or root directory. In this implementation, the data structure further includes a second relationship graph node representing a second asset, the second asset including a second asset identifier and at least one of a second relationship reference mapping to at least the first relationship graph node and a second annotation.

Figure 6:
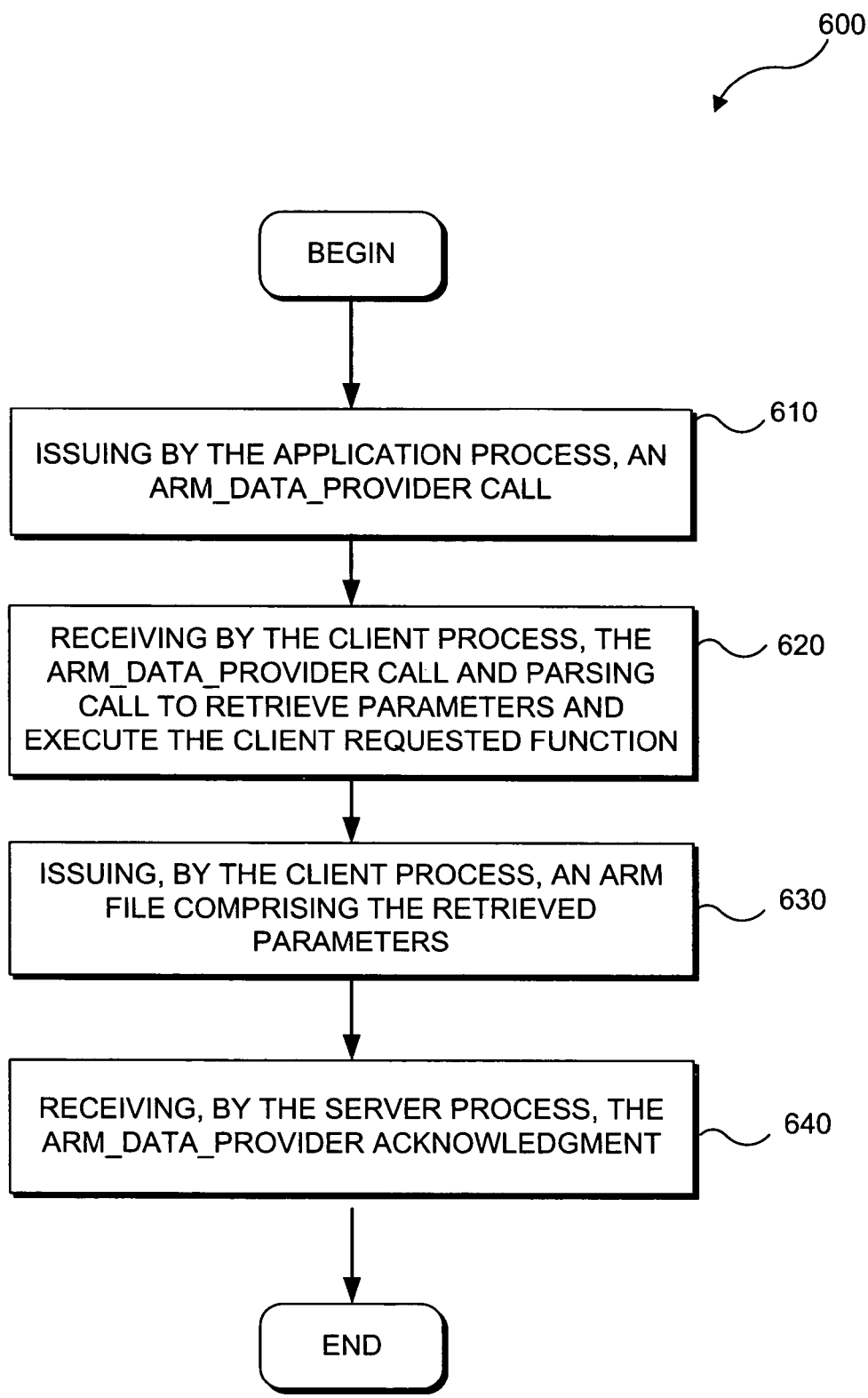
FIG. 6 is a flow diagram illustrating an exemplary method for generating an asset relationship management file with an ARM_data_provider API.

FIG. 6 is a flow diagram illustrating an exemplary method 600 for generating an asset relationship management file with an ARM_data_provider API. Method 600 can be implemented in some embodiments with components, and techniques, as discussed with reference to FIGS. 1-3. In some implementations, one or more steps of method 600 are embodied on a computer readable medium containing computer readable code so that a series of steps are implemented when the computer readable code is executed on a computing device, such as a microprocessor. In the following description, various steps of the method 600 are described with respect to a processor of a client device that can perform certain method steps, in communication (as appropriate) with a server that can also perform certain method steps. In some implementations, certain steps of method 600 can be combined, performed simultaneously or in a different order, without deviating from the objective of method 600 or without producing different results. Method 600 generally describes an API process that can include communication between an application process and a client process. Method 600 begins at a step 610.

In step 610, an application process issues an ARM_data_provider call including one or more call parameters such as an asset identifier, a client requested function, a relationship reference and an annotation. In one implementation, the client requested function is a request to write out one or more of the parameters to an ARM file. In one implementation, the application process is associated with an editor such as an art editor or a sound editor, or a report generating application.

In a step 620, a client process receives the ARM_data_provider call and in response, parses the call to retrieve the parameters and execute the client requested function. In one exemplary implementation, the client process is associated with an API module.

In a step 630, the client process issues an ARM file that includes the retrieved parameters. In one exemplary implementation, the ARM file is an XML document formatted according to an asset relationship management schema, which defines one or more objects corresponding to one or more parameters. In one example, the asset relationship management schema is a simple list. In another example, the asset relationship management schema is a tree of nodes. The ARM file can have any suitable document format and schema that allow the ARM file to be readily exchanged and utilized with a wide variety of off-the-shelf (i.e., existing) software packages.

In a step 640, a server process receives the ARM file and stores the ARM file in a data store (e.g., a hard drive). In some implementations, the ARM file may be stored locally with other files including asset files related to the ARM file. In other implementations, an off-site repository may store ARM files for retrieval on an as-needed basis. In yet other implementations, the ARM files may be stored in a volatile or non-volatile memory location controlled by an asset relationship engine to allow run-time access for on-the-fly asset relationship graph creation.

By way of further illustration, an exemplary application of the above-described content management applications and components can be described with reference to a game development environment. For example, a game development team composed of three separate groups is charged with developing a set of vehicles for a new video game. The first group is to develop a fire engine, the second group is to develop a police car, and the third group is to develop a racy sports car. The first team develops a fire engine mesh, which is a wire frame that defines the shape of the fire engine. The team saves the mesh file to a central repository and begins developing a material file and a sound file which will be associated with the mesh file and used when the fire engine is rendered. After developing just the right shade of fire-engine red, the first group saves the mesh file with a link to the fire-engine red material file and a link to a pre-existing engine sound file. All of the files for the fire engine are saved to the same repository accessible to the other development groups.

Meanwhile, the second group builds a police car asset file from an existing car mesh file, selecting pre-existing material files for black, white, and chrome portions of the police car, and then creates a siren sound file, all of which are referenced by the police car asset mesh file when it is saved to the central repository along with the referenced component files. The third group builds a new sports car mesh and links it to the fire engine red material file, the chrome material file, and to the preexisting engine sound file. However the third group decides during development that the pre-existing engine sound file isn't appropriate to the deep throated roar of a sports car and opens the sound file for editing. The team wishes to know what the impact of such changes will be on any other files in the game, but since the groups are working independently, the third group has no idea whether the other groups are using the same content files or how a change made to the sound file for the engine sound may impact other assets of the game.

However, with a game development system employing the concept described above, when each of the above asset files is saved, an ARM file is also created by the ARM_data_provider API, which writes out essential relationships that the asset file has to other asset files, and annotations containing useful information about the asset file, to an XML document according to a relationship management schema. The ARM file is stored in a central data store along with other files such as the original asset file (e.g., a material file such as a car mesh, color, texture, and sound or logic files, etc.) that it represents. The ARM file can then be used to generate an asset relationship graph that maps all of the dependency relationships between the asset files represented by the ARM files. It is important to note that the ARM_data_provider API can be retrofitted to an existing game development or content editing suite and that the relationship management schema used to schematize the data contained in the ARM file can be applied quite easily across multiple platforms. This capability can provide different companies using different or even proprietary development tools the capability to export asset file dependency information and other data about a digital asset in a form that can be used by other parties.

For example, as the third group discussed above accesses the pre-existing engine sound file the content editing application can access a relationship graph via the graph_API to determine that the engine sound file is relied upon by another asset file, namely the fire engine asset file. The third group will thus recognize that the edited engine sound must be save to a new file to avoid changing the engine sound of the fire engine. Similarly, as the third group accesses the chrome material file, the ARM_graph API can be employed to alert the group that the chrome material file is relied upon by the police car asset file and therefore, the chrome material file should not be changed (with the same file name) because such changes will impact the appearance of the police car in the new game. As is evident from the above example, multiple groups working on a game can track the asset files on which they are working, such as mesh files, material files, sound files, artificial intelligence (AI) files, and the like, in real time, as the files are edited and created, even across different development platforms. Furthermore, through the ARM_data_provider API and the graph_API, it is possible to determine asset file dependencies prior to compiling a game, and therefore eliminate orphaned files and redundancies to reduce software "bloat," streamline the development pipeline, and improve quality assurance processes.

Although the present novel development has been described in connection with the preferred form of practicing it and modifications thereto, those of ordinary skill in the art will understand that many other modifications can be made to the present concept within the scope of the claims that follow. Accordingly, it is not intended that the scope of the concept in any way be limited by the above description, but instead be determined entirely by reference to the claims that follow.

The invention in which an exclusive right is claimed is defined by the following:

1. A method for managing digital game content relationship information associated with a plurality of digital game content files within a content development environment for exposing dependencies between the digital game content files to a content editing process upon request, comprising:

providing a data provider application programming interface (API) for communicating between a client process and a server process in the content development environment, the data provider API being configured for use with a game content editing application;

generating an asset relationship management file with the data provider API, the asset relationship management file including an asset identifier which uniquely identifies a digital asset and including at least one relationship reference describing a linking or a dependency relationship with at least one other digital asset file;

the asset relationship management file being written out by the data provider API from a digital asset being edited by the client content editing process;

storing the asset relationship management file to a data store;

generating an asset relationship graph based on at least the asset relationship management file, the asset relationship graph comprising a plurality of asset graph nodes, each node corresponding to a particular content file, the asset graph nodes mapping dependency and referential relationships between a plurality of digital game content files, each uniquely identified by a specific asset identifier, thus exposing dependency relationships between the digital game content files to a content editing process upon request; and generating a node tree in the asset relationship graph.

2. The method of claim 1, further comprising the step of providing a graph API for communicating between a client process and a server process in the content development environment, the graph API being configured for accessing the relationship graph through a server process to expose asset relationship data and annotation data to the client process.

3. The method of claim 2, further comprising:

receiving a call to the graph API from a client process requesting information associated with a specific asset;

in response to the call, issuing an asset information request from the graph API;

interrogating the asset relationship graph for the information associated with the specific asset; and returning a response to the call to the client process from the graph API, the response being associated with the specific asset and based on the information resulting from the step of interrogating.

4. The method of claim 3, wherein interrogating the relationship graph for the information associated with the specific asset comprises:

accessing an asset relationship object model through the graph API, the asset relationship object model being configured to navigate the plurality of asset graph nodes of the asset relationship graph, exposing relationship references and annotations; and identifying each relationship reference associated with the specific asset in the asset relationship graph.

5. The method of claim 1, further comprising the step of providing an asset relationship management schema, the asset relationship management schema defining at least one of an annotation object and a relationship reference object.

6. The method of claim 5, wherein the asset relationship management file comprises the asset relationship management schema embodied in an XML document.

7. The method of claim 1, wherein the annotation is at least one of:
an asset version indicator;
an asset approval indicator;
an asset description;
a color depth indicator;
compression algorithm data associated with the asset;
a date indicator;
an asset type indicator;
a rule associated with the asset; and
an attribute associated with the asset.

8. The method of claim 1, wherein generating the relationship graph comprises:

providing the asset relationship management file to a relationship management engine, the relationship management engine being configured for communication with the data store;

parsing the asset relationship management file to identify each relationship reference and annotation; and wherein the node tree is associated with the asset relationship management file and maps each asset node of the asset relationship graph that is associated with at least one of a relationship reference and an annotation that were identified in the step of parsing.

9. The method of claim 8, further comprising:

configuring the relationship management engine to monitor the data store and identify each new asset management file; and invoking the relationship management engine to map each new asset management file that is thus identified, into an instantiation within the asset relationship graph as an asset node.

10. A computer readable medium having machine readable instructions for communicating between a client process and a server process in a distributed processing system for displaying relationship information between a plurality of digital content files, the computer-executable instructions, when executed by a computing device, causing a plurality of functions to be carried out, including:

issuing, by the client process, an ARM_graph call having a plurality of call parameters comprising an asset identifier uniquely identifying a particular digital content file, a data store identifier, and a client requested function;

receiving, by the server process, the ARM_graph call, and parsing the ARM_graph call and retrieving the plurality of call parameters;

receiving, by the server process, the ARM graph call, and parsing the ARM_graph call and retrieving the plurality of call parameters; and loading, by the server process, an ARM graph in response to the ARM_graph call and displaying relationship information between the digital content files, the relationship information comprising dependencies between the content files and one or more annotations, the annotations comprising information that is useful to write out from an asset and make available as a resource.

11. The computer readable medium of claim 10, wherein the machine readable instructions, when executed, further cause the following functions to be carried out:

(a) interrogating the ARM graph, by the server process, in response to the ARM_graph call;

(b) issuing, by the server process, an ARM_graph acknowledgment having a plurality of acknowledgment parameters comprising the asset identifier, and at least one of an asset relationship reference and an annotation; and (c) receiving, by the client process, the ARM_graph acknowledgment.

12. The computer readable medium of claim 11, wherein the machine readable instructions, when executed, further cause the following functions to be carried out:

(a) parsing the ARM_graph acknowledgment to retrieve at least one of the plurality of acknowledgment parameters; and (b) providing the at least one parameter retrieved to a client application process, thus exposing relationship information between the digital content files.

13. The computer readable medium of claim 11, having stored thereon an ARM graph data structure, comprising:

(a) a first ARM graph node representing a first asset, the first ARM graph node including a first asset identifier and at least one of a relationship reference, and an annotation; and (b) a second relationship graph node representing a second asset, the second asset including a second asset identifier and at least one of a second relationship reference mapping to at least the first relationship graph node, and a second annotation.

14. The computer readable medium of claim 10, wherein the machine readable instructions provide for communicating between an application process and the client process, and when executed, carry out the functions of:

(a) issuing, by the application process, an ARM_data_provider call having a plurality of call parameters comprising an asset identifier, a client requested function, and at least one of a relationship reference and an annotation;

(b) receiving, by the client process, the ARM_data_provider call and parsing the call to retrieve the parameters and execute the client requested function;

(c) issuing, by the client process, an ARM file comprising the retrieved parameters; and (d) receiving, by the server process, the ARM file, and storing the ARM file in a data store.

* * * * *